United States Patent
Chen et al.

(10) Patent No.: US 7,898,920 B2
(45) Date of Patent: Mar. 1, 2011

(54) HEADER REGION PROTECTION APPARATUS AND METHOD OF OPTICAL STORAGE MEDIUM

(75) Inventors: Hong-Ching Chen, Fang-Shan (TW); Chih-Chung Wu, Pingtung (TW); Kun-Hung Hsieh, Zhubei (TW)

(73) Assignee: Mediatek, Inc., Hsin-Chu (TW)

( * ) Notice: Subject to any disclaimer, the term of this patent is extended or adjusted under 35 U.S.C. 154(b) by 716 days.

(21) Appl. No.: 11/385,530

(22) Filed: Mar. 20, 2006

(65) Prior Publication Data

US 2007/0217308 A1     Sep. 20, 2007

(51) Int. Cl.
*G11B 27/36* (2006.01)
(52) U.S. Cl. .................. 369/53.21; 369/275.3
(58) Field of Classification Search .............. 369/275.3, 369/53.21
See application file for complete search history.

(56) References Cited

U.S. PATENT DOCUMENTS 6,661,752 B2 * 12/2003 Eom .................... 369/47.1
6,714,501 B2 *  3/2004 Eom .................... 369/53.34

* cited by examiner

*Primary Examiner*—Tan X Dinh
*Assistant Examiner*—Andrew J Sasinowski
(74) *Attorney, Agent, or Firm*—Thomas | Kayden

(57) ABSTRACT

A header region protection apparatus of an optical storage medium. The apparatus comprises an encoder, a header location generator, and a header protector. The encoder converts user data to an EFM signal and a write enable signal according to a write clock. The header location generator generates a header location signal. The header protector is coupled to the encoder and the header location generator and generates a header protect write enable signal according to the write enable signal and the header location signal.

5 Claims, 12 Drawing Sheets

HEADER REGION PROTECTION APPARATUS AND METHOD OF OPTICAL STORAGE MEDIUM

BACKGROUND

The invention relates to a write apparatus of an optical storage medium and, in particular, to an apparatus protecting a header region of the optical storage medium.

Digital Versatile Disc - Random Access Memory (DVD-RAM) is a disc specification which specifies rewritable DVD-RAM media and appropriated DVD writers. An optical disc with DVD-RAM format is divided into a plurality of sectors, each consisting of a write region and a header region. Each header region is embossed with physical information data (PID) therein. Overwriting is not allowed in the header region, or the physical information data (PID) may be damaged. Thus, it is necessary to stop recording before the header region of the next sector.

However, when data is written to the optical disc in DVD-RAM format, the data can be overwritten in the header region. When the duration of a write clock period is longer than it should be, data can be written in the header region of the next sector. As a result, the physical information data (PID) are damaged and the written user data cannot be retrieved.

U.S. Pat. No. 6,661,752 discloses a method of protecting a header region by detection thereof, as shown in FIG. 1. When the header region is detected, data recording is stopped and part of the encoded EFM data is not written through a laser diode. Thus, the unwritten data needs to be encoded again and written to another sector later. Alternatively, the write process may stop temporarily and restart after the write system is stabilized. According to DVD-RAM format, a buffer field of 25 bytes prvides redundancy in a sector of 2697 bytes. In other words, no error more than 1% is allowed. However, when the wobble quality of the optical disc is not good or rotation of a spindle is perturbed, variation of a write clock for header detection exceeds 1%. As a result, data recording is often interrupted when the header region is detected during data recording.

SUMMARY

An embodiment of a header region protection apparatus of an optical storage medium comprises an encoder, a header location generator, and a header protector. The encoder converts user data to an EFM signal and a write enable signal according to a write clock. The header location generator generates a header location signal. The header protector is coupled to the encoder and the header location generator and generates a header protect write enable signal according to the write enable signal and the header location signal.

An embodiment of a header region protection method of an optical storage medium comprises converting user data to an EFM signal and a write enable signal according to a write clock, generating a header location signal according to a dynamically determined sector period, and generating a header protect write enable signal according to the write enable signal and the header location signal.

An embodiment of an apparatus of predicting a header region of an optical storage medium comprises a detector, a first counter, a second counter, and a header region predictor. The detector detects physical information data in a header EFM signal. The first counter generates a first counter value and calculates a write clock. The second counter resets a second counter value when the first counter value becomes a first predetermined value and calculates a fixed clock. The header region predictor generates a header location signal when the second counter value becomes a second predetermined value.

DETAILED DESCRIPTION

Figure 1:
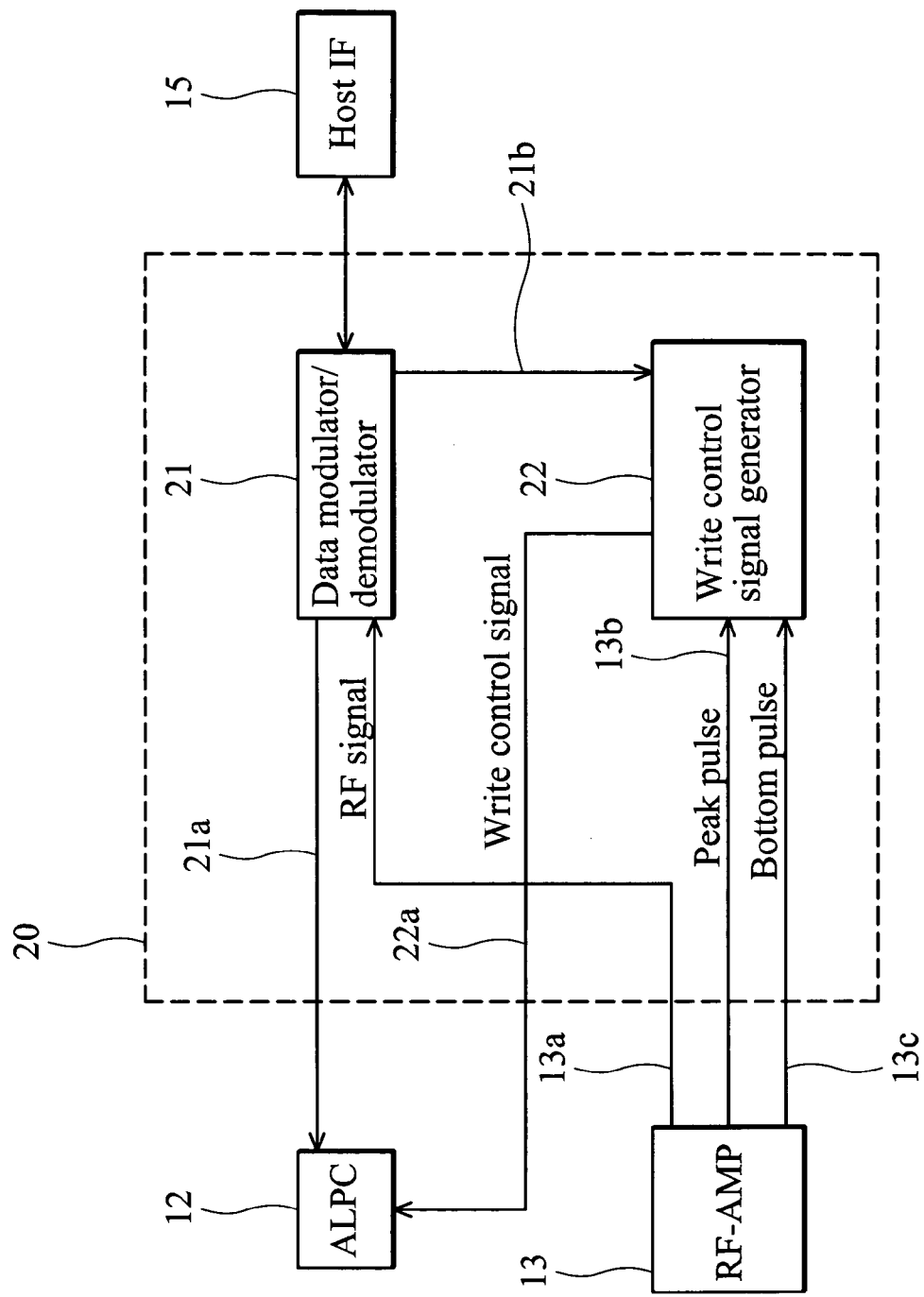
FIG. 1 shows a header region protection apparatus of an optical disc as disclosed in U.S. Pat. No. 6,661,752.
Figure 2:
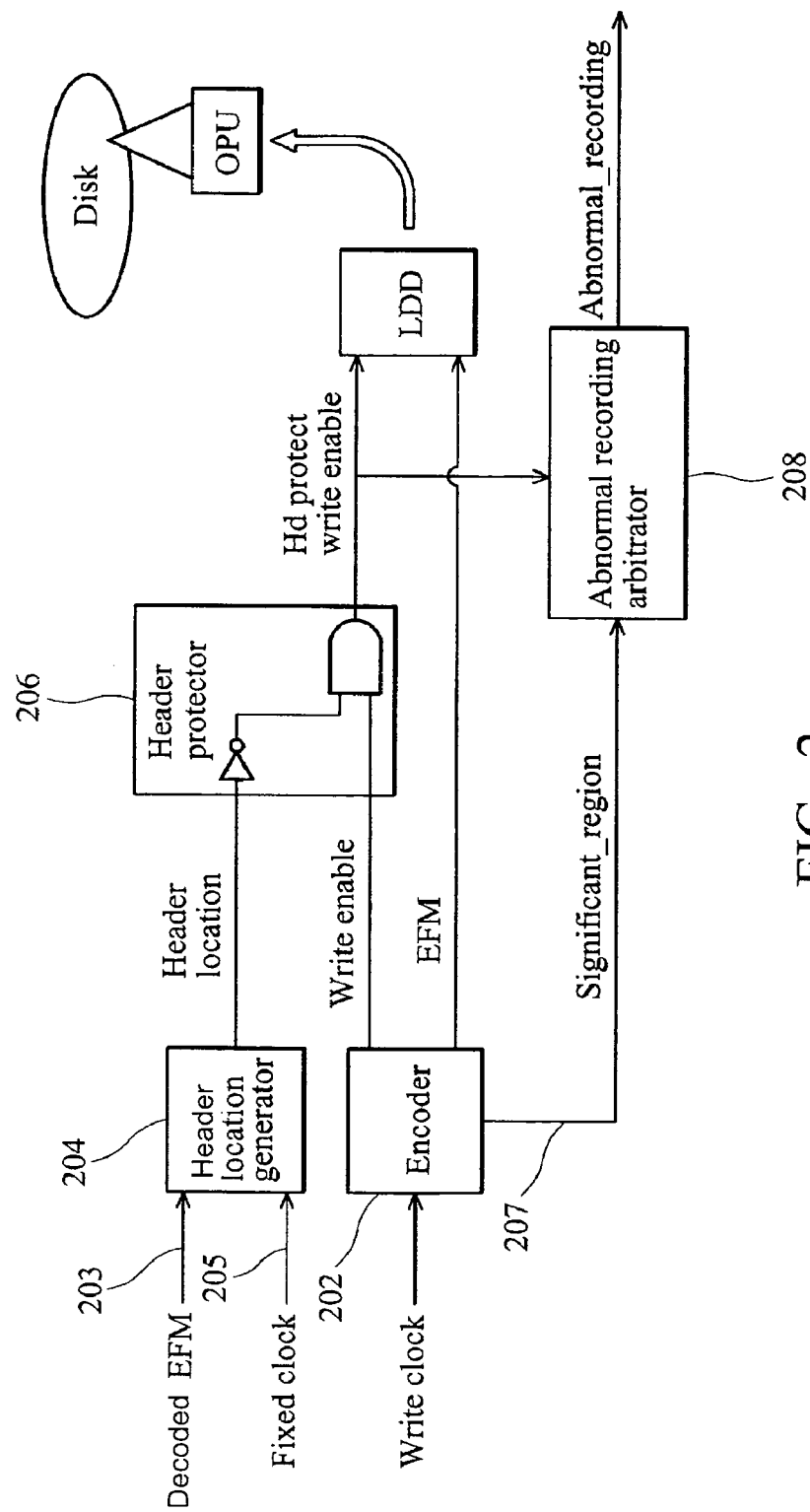
FIG. 2 shows a header region protection apparatus of an optical storage medium according to an embodiment of the invention.

FIG. 2 shows a header region apparatus of an optical storage medium according to an embodiment of the invention. The apparatus comprises an encoder 202, a header location generator 204, and a header protector 206. The encoder 202 converts user data to an EFM signal and a write enable signal according to a write clock. The header location generator 204 receives decoded EFM and a fixed clock and generates a header location signal. The header location generator predicts a header location by counting the fixed clock between decoded PID signals in two consecutive sectors. The header protector 206 is coupled to the encoder 202 and the header location generator 204 and generates a header protect write enable signal according to the write enable signal and the header location signal.

Furthermore, the header location generator 204 has two input terminals respectively receiving a decoded EFM signal and a fixed clock, wherein the fixed clock is independent of the write clock. The encoder 202 further comprises an output terminal 207 for transmitting a significant region signal generated according to the EFM signal.

As shown in FIG. 2, the header region protection apparatus of an optical storage medium may further comprise an abnormal recording arbitrator 208. The abnormal recording arbitrator 208 detects an abnormal recording by comparing timings of the header protect write enable signal and the significant region signal.

Figure 3A:
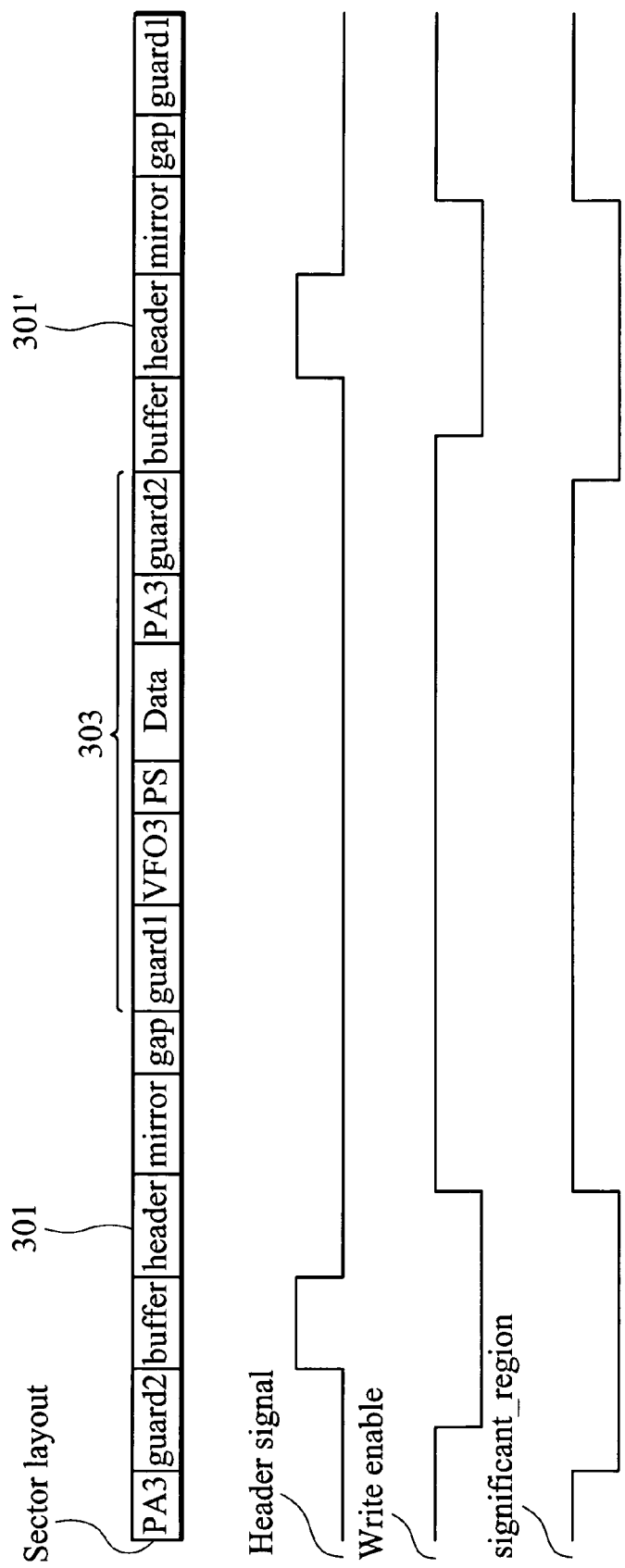
FIG. 3A shows a normal recording mode of the header region protection apparatus of an optical storage medium according to an embodiment of the invention.

FIG. 3A shows a normal recording mode of the header region protection apparatus of an optical storage medium according to an embodiment of the invention. In FIG. 3A, a sector layout of DVD-RAM format is shown. Each sector comprises a header region 301/301' and a write region 303. The header location generator detects a header region 301 and generates a header location signal. The encoder converts user data to an EFM signal and generates a write enable signal, corresponding to the write region 303, at a high state. The encoder also generates a significant region signal which specifies a significant region in the sector containing important data.

Figure 3B:
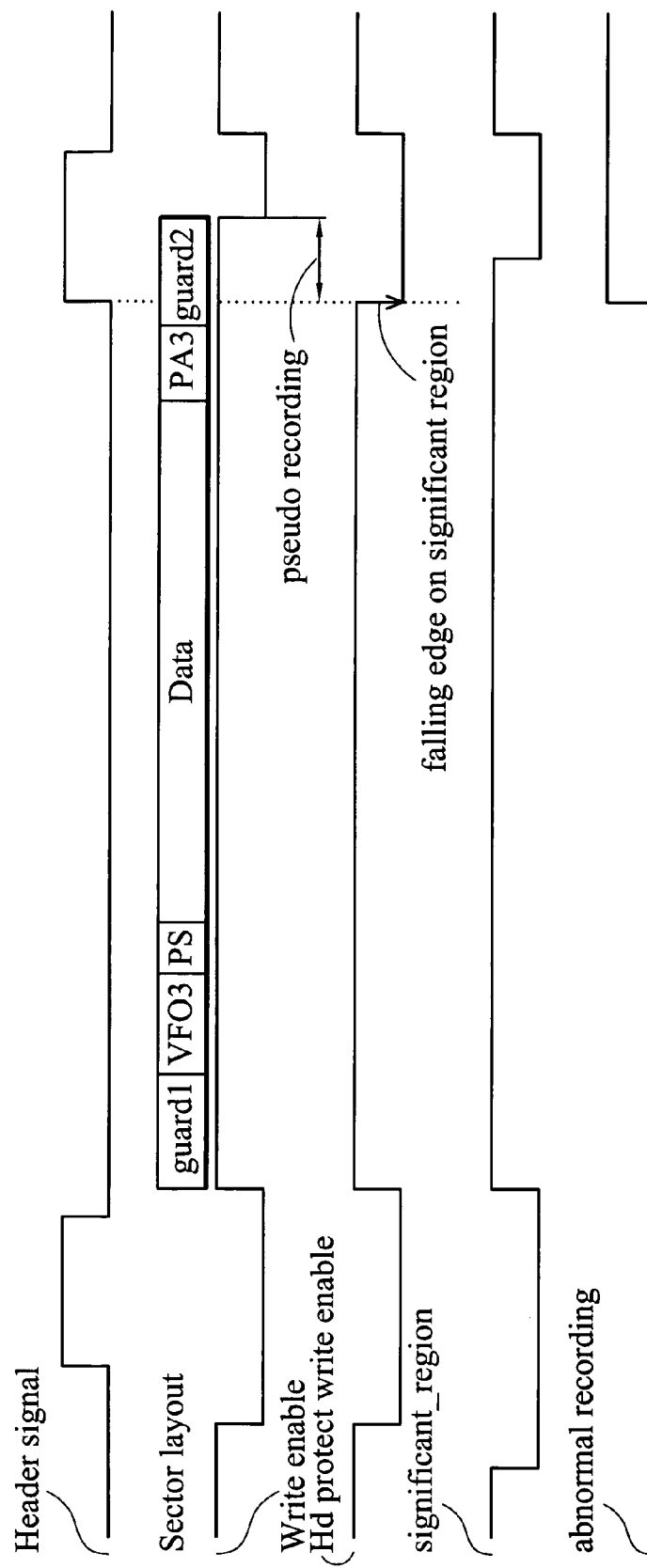
FIG. 3B shows an abnormal recording mode of the header region protection apparatus of an optical storage medium according to an embodiment of the invention.

FIG. 3B shows an abnormal recording mode of the header region protection apparatus of an optical storage medium according to an embodiment of the invention. The subsequent header region is detected when part of the data is not yet written to the write region. The header protector generates a header protect write enable signal according to the write enable signal and the header location signal. A low state of the header protect write enable signal controls a laser diode driver and thus mutes the power output of a laser diode. Thus, recording is stopped and the subsequent header region is not damaged by a write power of the laser diode. Since data not written to the write region is important, a header protect write enable signal transition in the significant region SR is detected by an abnormal recording arbitrator and thus an abnormal recording signal transitions. The write process stops temporarily and restarts after the write system is stabilized. The abnormal recording signal transition restarts the reprocessing sequence or another write process.

Figure 3C:
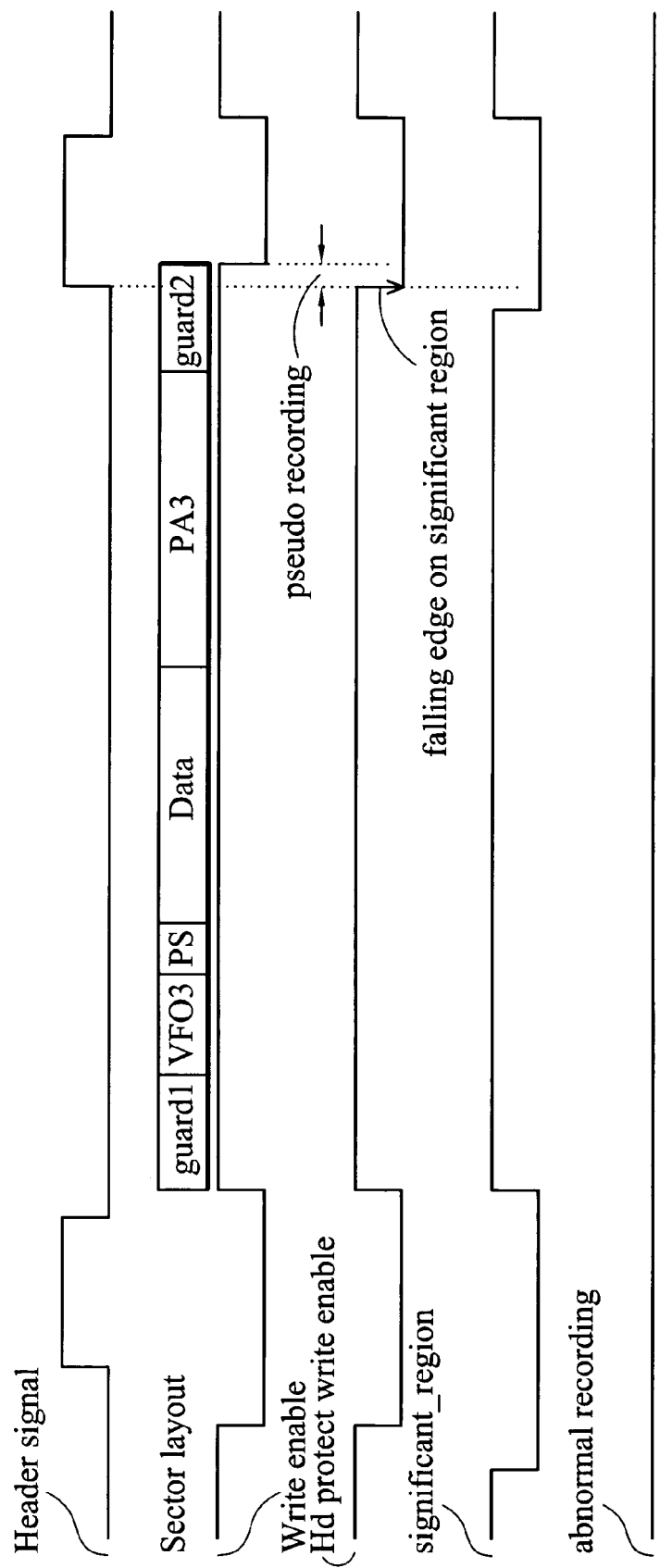
FIG. 3C shows a pseudo recording mode of the header region protection apparatus of an optical storage medium according to an embodiment of the invention.

FIG. 3C shows a pseudo recording mode of the header region protection apparatus of an optical storage medium according to an embodiment of the invention. The subsequent header region is detected when part of the data is not yet written to the write region. Since the data not written into the write region does not contain important data, there is no header protect write enable signal transition in the significant region. As a result, the abnormal recording signal does not transition. In this case, since the data not written into the write region does not contain important data, it can be ignored and no additional processing is required. In addition, recording does not need to be stopped.

Figure 4:
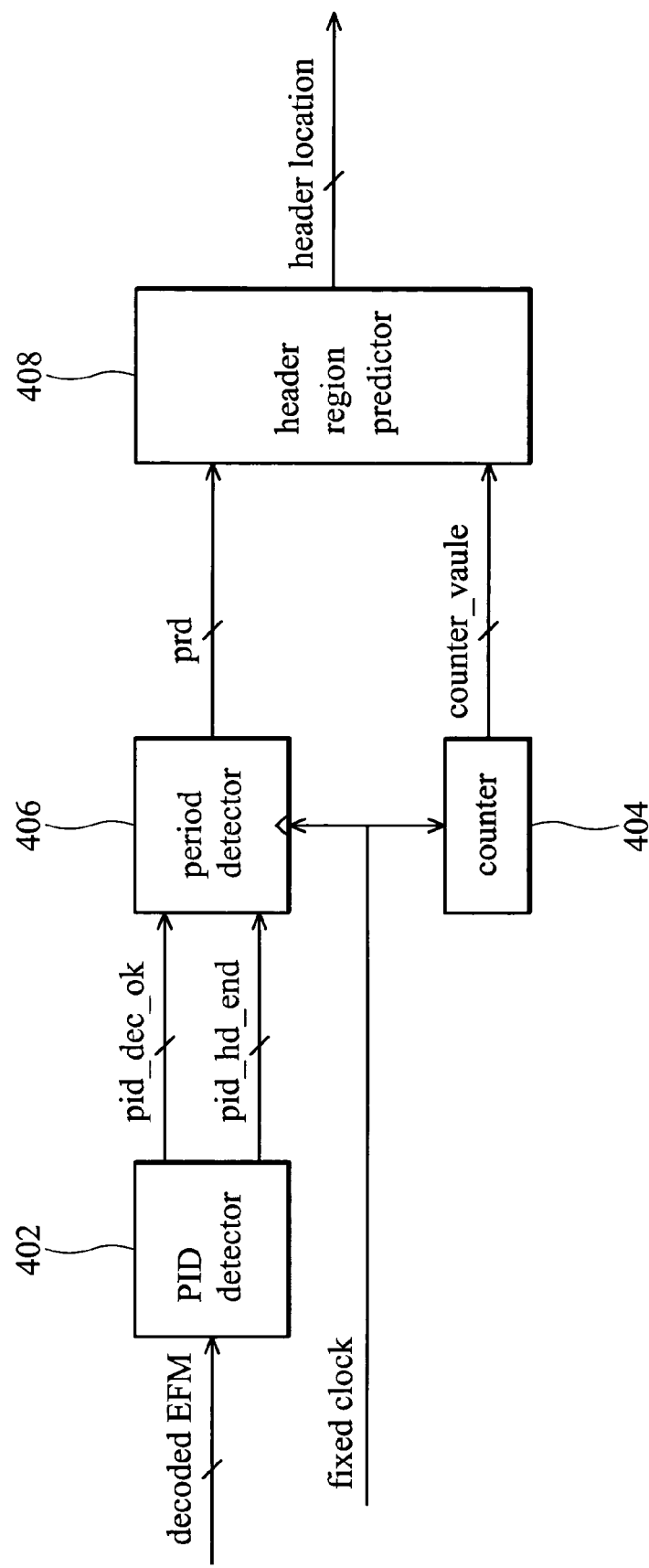
FIG. 4 shows a header location generator according to an embodiment of the invention.

FIG. 4 shows a header location generator according to an embodiment of the invention. The header location generator comprises a PID detector 402, a counter 404, a sector period detector 406, and a header region predictor 408. The PID detector 402 detects physical information data (PID) in a decoded EFM signal and provides a pid_dec_ok signal and a pid_hd_end signal to a sector period detector 406. A fixed clock is provided to the sector period detector 406 and the counter 404. The sector period detector 406 counts the fixed clock between two consecutive pid_hd$_{13}$ end pulses with PID thereof successfully decoded. As a result, the sector period detector provides a sector period value prd to the header region predictor 408. The counter 404 counts the fixed clock and provides a counter value to the header region predictor 408. When the counter value reaches the dynamically determined sector period value prd, the header region predictor 408 generates the header location signal.

Figure 5:
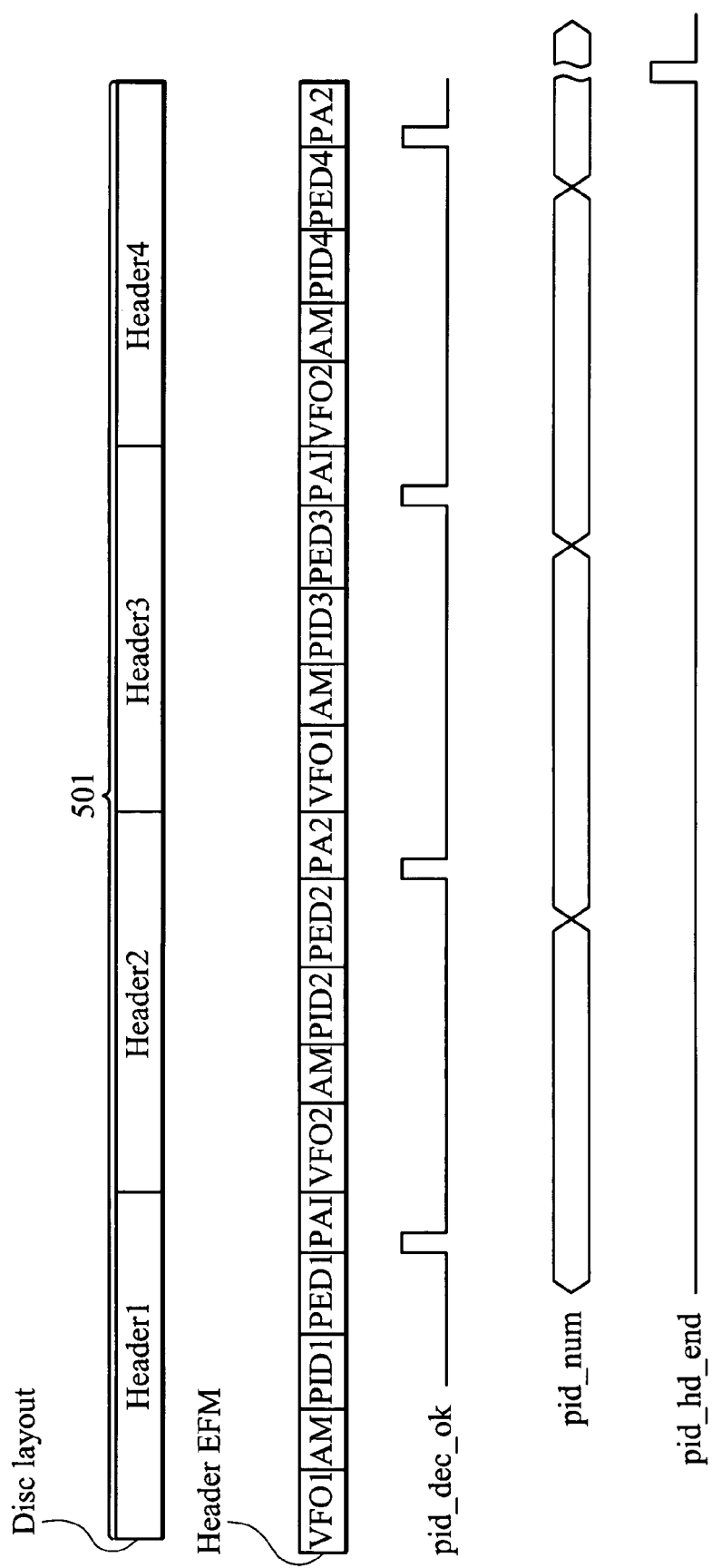
FIG. 5 shows waveforms required by the header location generator in FIG. 4.

FIG. 5 shows waveforms required by the header location generator in FIG. 4. Each sector in the DVD-RAM disc comprises 2697 bytes and a header region 501 of 128 bytes, a mirror field 503 of 2 bytes, and a recording field 505 of 2567 bytes. The header region 501 further comprises a header 1 field, header 2 field, header 3 field, and header 4 field, each of which comprises 46 bytes or 18 bytes and includes a 36 or 8-byte sync. Code portion VFO (Variable Frequency Oscillator), 3-byte address mark (Address Mark), 4-byte address portion PID, 2-byte error detection code IED (ID Error Detection Code), and 1-byte postamble PA.

The address mark AM is a sync. code of "3" bytes indicating the position at which the sector address starts. The address portions PID1 to PID4 are areas in which sector addresses (containing ID numbers) as 4-byte address information are recorded. The sector address is a physical sector number as a physical address indicating the physical position on the track, and since the physical sector number is recorded in the mastering step, it is impossible to rewrite the same. The error detection code IED is an error detection code for the sector address (containing the ID number) and can be used to detect the presence or absence of an error in the readout PID.

The PID detector detects the physical information data according to the PID1 to PID4 and IED1 to IED4. When physical information data in header 1 field to header 4 field is detected, a pid_dec_ok signal and a pid_number signal, respectively shown in FIG. 5, are generated. A value dly_val0 to dly_val3 is loaded into the PID based predict counter 404 according to the pid_number signal and the pid_dec_ok signal. As a result, an end of the header region can be predicted and thus a pid_hd_end signal, shown in FIG. 5, is generated by the PID based predict counter 404. Theoretically, the prediction of the end of the header region is more reliable if the physical information data in the header 4 field is detected.

Figures 1, 6A:
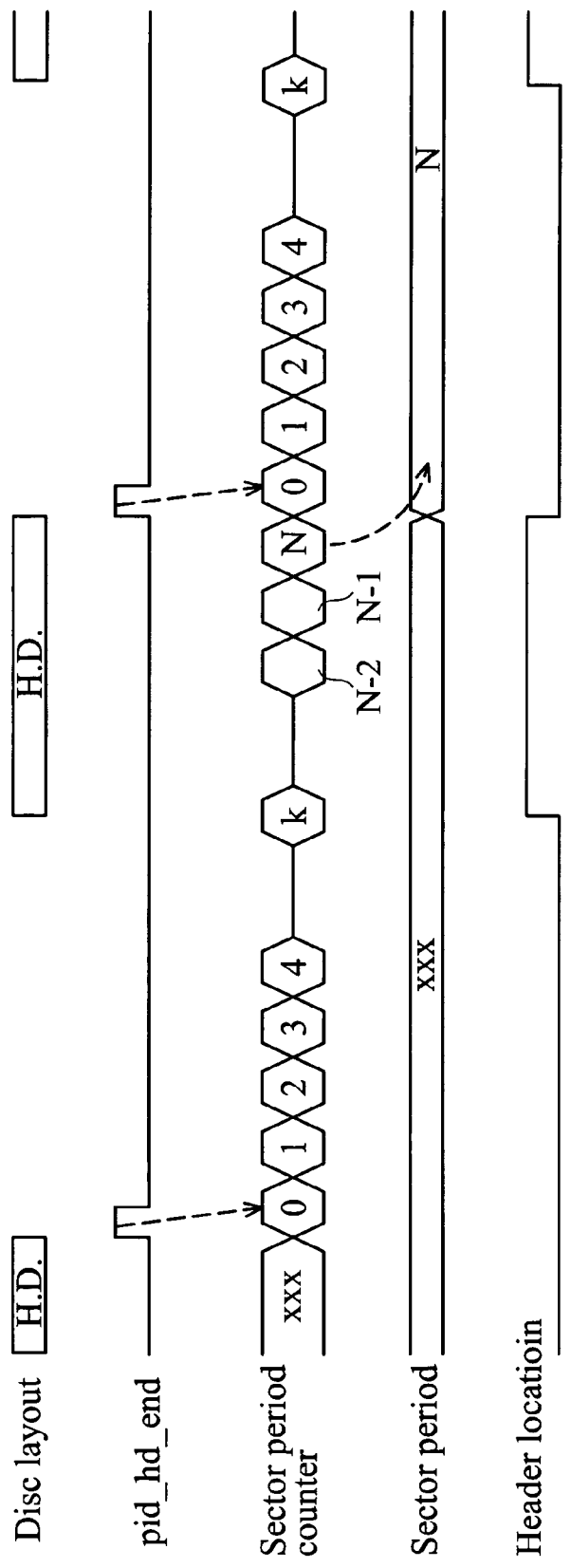
FIG. 6A shows timing diagrams of output signals of the PID based predict counter, the sector period counter, and the header region predictor when physical information data in every header region are detected.
Figures 2, 6A:
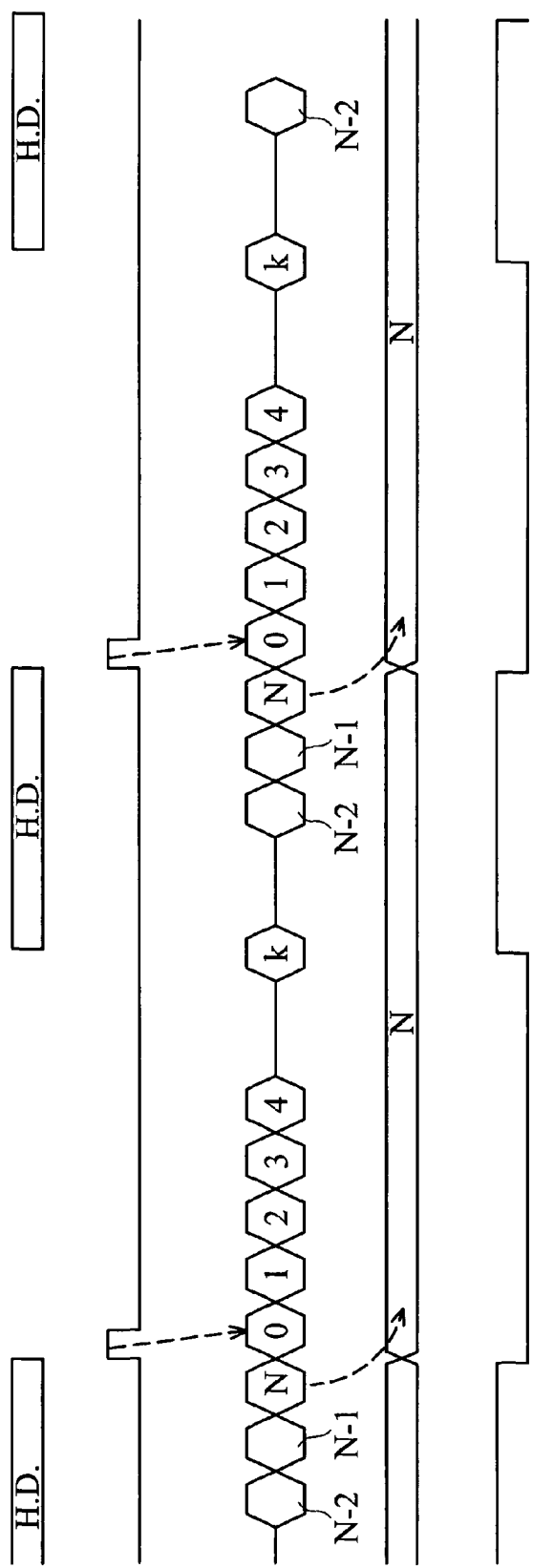

FIG. 6A shows timing diagrams of output signals of the PID based predict counter, the sector period counter, and the header region predictor when physical information data in header regions is detected. Also shown in FIG. 6A is a value sector_period. A pulse of the output signal pid_hd_end of the PID based predict counter resets a sector period counter. The last counter value before the sector period counter is reset is loaded into a register and the loaded value is a sector_period. The sector_period indicates the number of fixed clock cycles of a DVD-RAM sector. The sector_period can be a predetermined value or estimated from the PID locations in two adjacent secotrs.

Figures 1, 6B:
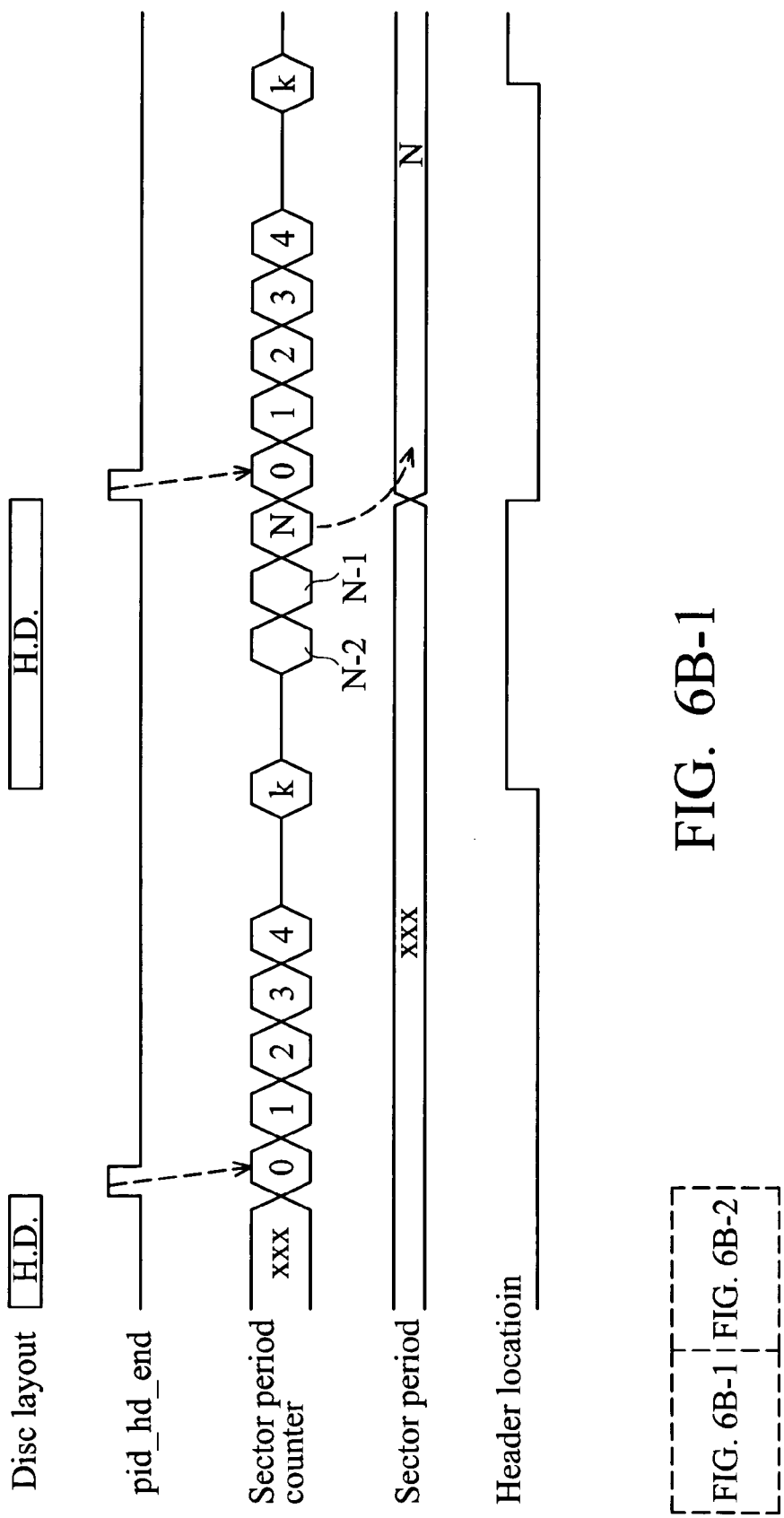
FIG. 6B shows timing diagrams of output signals of the PID based predict counter, the sector period counter, and the header region predictor when physical information data in one of the header regions are not detected.
Figures 2, 6B:
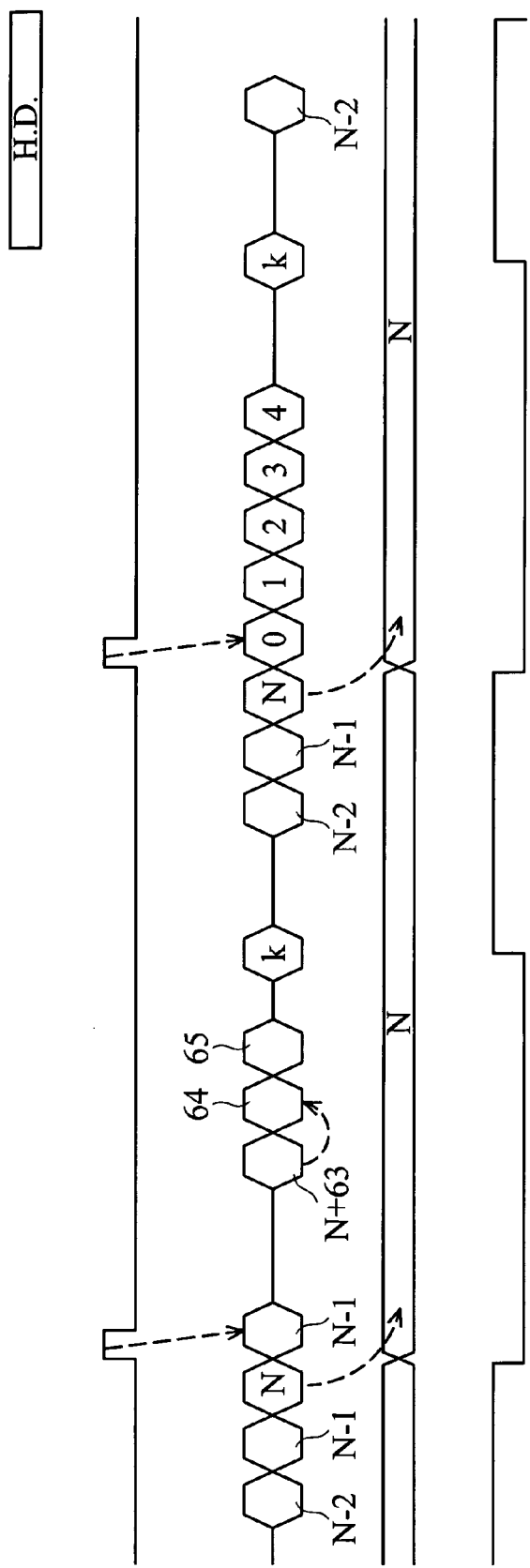

FIG. 6B shows timing diagrams of output signals of the PID based predict counter, the sector period counter, and the header region predictor when physical information data in one of the header regions are not detected, wherefore a pulse of the pid_dec_ok signal cannot be generated to reset the sector period counter. In such a case, the sector period counter automatically resets itself to 64 when the counter value of the sector period counter reaches (sector_period+64).

Figure 7:
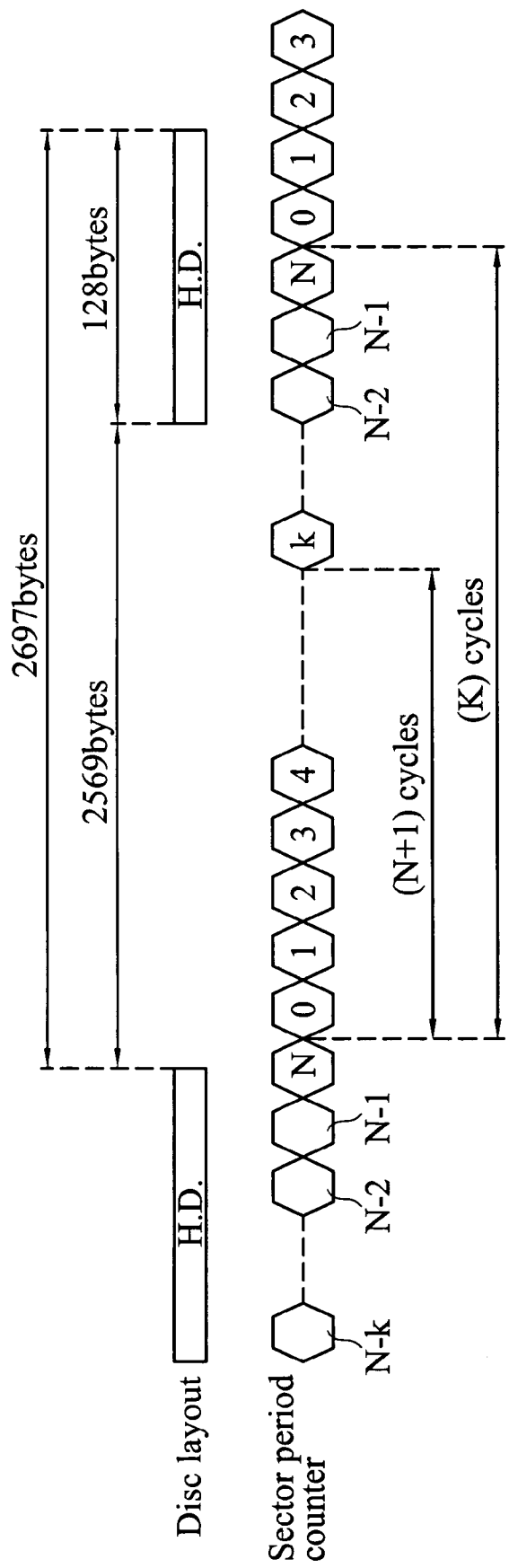
FIG. 7 is a schematic diagram of how to predict a header region according to an embodiment of the invention.

FIG. 7 shows a schematic diagram of a header region prediction according to an embodiment of the invention. A disc layout and a counter value of a sector period counter are shown in FIG. 7. Since there are 2697 bytes in a sector and 2569 bytes between two header regions, the ratio of numbers of fixed clock cycles k to N+1 is $$\frac{2569}{2697},$$

approximately $$\frac{20}{21}.$$

The header region predictor generates a pulse of a header location signal according to a counter value of the sector period counter and a value of the sector_period. As shown in FIG. 7, the counter value of the sector period counter in the header region ranges from $$\left(\frac{20}{21} * \text{sector\_period}\right) \text{ to sector\_period.}$$

While the invention has been described by way of example and in terms of preferred embodiment, it is to be understood that the invention is not limited thereto. To the contrary, it is intended to cover various modifications and the advantages would be apparent to those skilled in the art. Therefore, the scope of the appended claims should be accorded the broadest interpretation so as to encompass all such modifications.

What is claimed is:

1. A header region protection apparatus of an optical storage medium, comprising:
   an encoder converting user data into an EFM signal and a write enable signal according to a write clock and generating a significant region signal according to the EFM signal, wherein the significant region signal specifies a significant region containing important data;
   a header location generator generating a header location signal; and
   a header protector generating a header protect write enable signal according to the write enable signal and the header location signal,
   wherein the header location generator comprises a PID detector receiving a decoded EFM signal, a sector period detector receiving a fixed clock, a PID decoding signal and a header end signal provided by the PID detector, a counter receiving and counting the fixed clock, a header region predictor receiving a sector period value dynamically determined by the sector period detector and a counter value generated by the counter, and two input terminals respectively receiving the decoded EFM signal and the fixed clock, wherein the fixed clock is independent of the write clock.

2. A header region protection apparatus of an optical storage medium, comprising:
   an encoder converting user data to an EFM signal and a write enable signal according to a write clock and generating a significant region signal according to the EFM signal, wherein the significant region signal contains important data;
   a header location generator generating a header location signal;
   a header protector generating a header protect write enable signal according to the write enable signal and the header location signal; and
   an abnormal recording arbitrator detecting abnormal recording by comparing timing of the header protect write enable signal and the significant region signal.

3. A header region protection method of an optical storage medium, the method comprising:
   converting user data to an EFM signal and a write enable signal according to a write clock, and generating a significant region signal according to the EFM signal, wherein the significant region signal contains important data;
   generating a header location signal according to a dynamically determined sector period;
   generating a header protect write enable signal according to the write enable signal and the header location signal; and
   detecting abnormal recording by comparing timing of the header protect write enable signal and the significant region signal.

4. The method as claimed in claim 3, wherein the header location signal is generated according to a decoded EFM signal and a fixed clock, wherein the fixed clock is independent of the write clock.

5. A header region protection apparatus of an optical storage medium, comprising:
   a detector detecting physical information data in a header EFM signal;
   a first counter generating a first counter value and calculating a write clock;
   a second counter resetting a second counter value when the first counter value reaches a first predetermined value and calculating a fixed clock by reference to the header EFM signal; and
   a header region predictor generating a header location signal when the second counter value reaches a second predetermined value.

* * * * *